United States Patent [19]

Fiory

[11] Patent Number: 5,305,416
[45] Date of Patent: Apr. 19, 1994

[54] SEMICONDUCTOR PROCESSING TECHNIQUE, INCLUDING PYROMETRIC MEASUREMENT OF RADIANTLY HEATED BODIES

[75] Inventor: Anthony T. Fiory, Summit, N.J.

[73] Assignee: AT&T Bell Laboratories, Murray Hill, N.J.

[21] Appl. No.: 42,028

[22] Filed: Apr. 2, 1993

[51] Int. Cl.$^5$ .............................................. G01J 5/10
[52] U.S. Cl. ..................... 392/416; 118/724; 374/126
[58] Field of Search ............. 392/416, 418; 219/405, 219/411, 390; 118/725, 724, 50.1; 374/126, 128, 129–132, 9; 250/492.1

[56] References Cited

U.S. PATENT DOCUMENTS

| | | | |
|---|---|---|---|
| 4,919,542 | 4/1990 | Nulman et al. | 374/126 |
| 5,061,084 | 10/1991 | Thompson et al. | 374/128 |
| 5,114,242 | 5/1992 | Gat et al. | 374/128 |
| 5,147,498 | 9/1992 | Nashimoto | 118/725 |
| 5,154,512 | 10/1992 | Schietinger et al. | 374/9 |
| 5,239,488 | 8/1993 | Markham et al. | 374/130 |

FOREIGN PATENT DOCUMENTS

| | | | |
|---|---|---|---|
| 490914 | 6/1955 | Italy | 374/130 |
| 763698 | 9/1980 | U.S.S.R. | 374/126 |

*Primary Examiner*—Bruce A. Reynolds
*Assistant Examiner*—John A. Jeffery
*Attorney, Agent, or Firm*—Martin I. Finston

[57] ABSTRACT

In a process for heating, e.g., a semiconductor wafer within a processing chamber, the wafer is exposed to a flux of electromagnetic radiation from lamps energized by alternating electric current. The surface temperature of the wafer is measured, and responsively, the radiation flux is controlled. The temperature measurement procedure includes collecting radiation propagating away from the wafer in a first light-pipe probe, collecting radiation propagating toward the wafer in a second light-pipe probe and detecting radiation collected in the respective probes. This procedure further involves determining, in the signal received from each probe, a magnitude of a time-varying component resulting from time-variations of the energizing current, and combining at least these magnitude according to a mathematical expression from which the temperature can be inferred. At least some of the radiation collected by the second probe is collected after reflection from a diffusely reflecting surface. The second probe effectively samples this radiation from an area of the diffusely reflecting surface that subtends a solid angle $\Omega_2$ at the wafer surface. The first probe effectively samples radiation from an area of the wafer that subtends a solid angle $\Omega_1$ at the first probe. The radiation sampling is carried out such that $\Omega_2$ is at least about $\Omega_1$.

11 Claims, 4 Drawing Sheets

SEMICONDUCTOR PROCESSING TECHNIQUE, INCLUDING PYROMETRIC MEASUREMENT OF RADIANTLY HEATED BODIES

FIELD OF THE INVENTION

This invention relates to the field of pyrometry, and more particularly, to pyrometric observation of radiantly heated semiconductor wafers within reactors or furnaces designed for rapid thermal processing.

ART BACKGROUND

In rapid thermal processing (RTP), workpieces such as semiconductor wafers can be subjected to specified temperature cycles of arbitrary complexity. For this reason, RTP is useful for carrying out thermally dependent processes, such as diffusion and annealing, in the course of manufacturing integrated circuits. However, some of these processes require the temperature to be controlled within limits as small as ±10° C. or less. Such fine control is possible only if the wafer temperature can be measured to precision that is comparably high. Although thermocouples installed directly on the wafers will give precise temperature measurements, the instrumented wafers will generally be unsuitable for forming into integrated circuits. If thermocouples are installed on only a few wafers in each batch, individual variations between wafers and between locations within the RTP reactor may cause unacceptable deviations between the actual and inferred temperatures of the non-instrumented wafers.

Optical pyrometry is a useful alternative to direct instrumentation of the wafers within the reactor. One pyrometric technique has been described in U.S. Pat. No. 5,154,512, issued to C. W. Schietinger et al. on Oct. 13, 1992. This technique is schematically illustrated in FIG. 1. According to this technique, a first light-pipe probe 10 is provided having an input aperture that faces wafer 20, and a second probe 30 is provided having an aperture that faces one of opposing lamp banks 40, which are typically linear arrays of quartz-tungsten-iodine lamps situated outside of processing chamber 50. First probe 10 samples radiation emitted and reflected by the wafer and directs the sampled radiation into detector 60. Second probe 30 samples radiation emitted by the lamps and directs the sampled radiation into the detector. Probe 30 receives radiation both in a direct path from the lamps and also by reflection from reflector 80. The emissivity $\epsilon$ of the wafer is inferred from the probe signals, and then the wafer temperature is inferred from the Planck radiation law, which relates the wafer thermal emittance w, the wafer emissivity $\epsilon$, and the wafer temperature T.

As noted, the first probe signal is a sum of emitted and reflected radiation. Information sufficient to resolve the emitted and reflected components is available because the emission from the lamps, which are driven by alternating current, has an ac component, referred to as "ripple." Because the thermal emission from the wafer has no significant ac component, the wafer reflectivity is estimated as the ratio of the ripple amplitudes in the first and second probe signals, respectively. After this reflectivity has been evaluated, the first probe signal is corrected to yield a resolved value of the wafer thermal emittance.

Although useful, this technique fails to take into account several potentially significant sources of systematic error. One such error involves the determination of wafer reflectivity. The theoretical temperature computation implicitly assumes that this reflectivity is the hemispherical reflectivity of the wafer. However, the reflectivity actually measured can diverge significantly from the hemispherical reflectivity, because both probes sample the radiation field from a relatively small area.

That is, an excellent approximation to hemispherical reflectivity could be provided if: probe 10 were to sample wafer reflections from a relatively small area of the wafer, probe 30 were to sample the lamp radiation over a hemispherical volume (i.e., over a solid angle approaching $2\pi$ steradians), and local fluctuations in lamp output and wafer reflectivity could be neglected. The second of these conditions is not fully satisfied, because most of the radiation collected by probe 30 enters the probe through end surface 90, which is typically a flat surface. As a consequence, probe 30 will typically collect radiation only over a view angle of 90° or less. This will generally lead to a significant divergence between the measured reflectivity and the hemispherical reflectivity.

Another potential systematic error involves local fluctuations in lamp output. Because, as noted, the second probe samples only a relatively small area, it may be ineffective for averaging these fluctuations.

Thus, practitioners in the field have hitherto failed to provide a pyrometric technique so robust again potential sources of systematic error that temperature measurements of ±10° C. accuracy or better can be made routinely at typical processing temperatures.

SUMMARY OF THE INVENTION

We have developed a number of improvements to the method of Schietinger et al. These improvements make it possible to routinely measure the wafer temperature with an accuracy of ±10° C. or better typical processing temperatures. These improvements include the use of a second probe that is modified to sample the radiation field from the lamps over a relatively large area. This provides a better approximation to the hermispherical reflectivity, and also tends to average local fluctuations in lamp output. Additional improvements involve details of the modeling of the radiation environment within the processing chamber that leads to more accurate interpretation of the signals from the first and second probes.

Accordingly, the invention is one embodiment involves a process of heating a body by exposing the body to a controllable flux of electromagnetic radiation from one or more lamps energized by alternating electric current, measuring the surface temperature of the body, and in response to the temperature measurement, controlling the flux of electromagnetic radiation. The temperature measurement is carried out, in part, by collecting a portion of thermal radiation and reflected lamp radiation propagating away from the body in a first light-pipe probe, collecting a portion of lamp radiation propagating toward the body in a second light-pipe probe, and detecting, as respectively first and second radiation signals, at least a portion of the radiation collected in the first and second probes. The temperature measurement further involves determining, in each of the first and second signals, a magnitude of a time-varying component resulting from time-variations of the energizing current. The temperature measurement further involves combining at least these magnitudes according to a mathematical expression from which the temperature can be inferred.

At least a portion of the radiation collected by the second probe is collected after reflection from a diffusely reflecting surface. The second probe effectively samples this radiation from an area of diffusely reflecting surface that subtends a solid angle $\Omega_2$ at the surface of the body. The first probe effectively samples radiation from an area of the body that subtends a solid angle $\Omega_1$ at the first probe. In contrast to methods of the prior art, the inventive method is carried out such that $\Omega_2$ is at least about $\Omega_1$.

DETAILED DESCRIPTION

Figure 1:
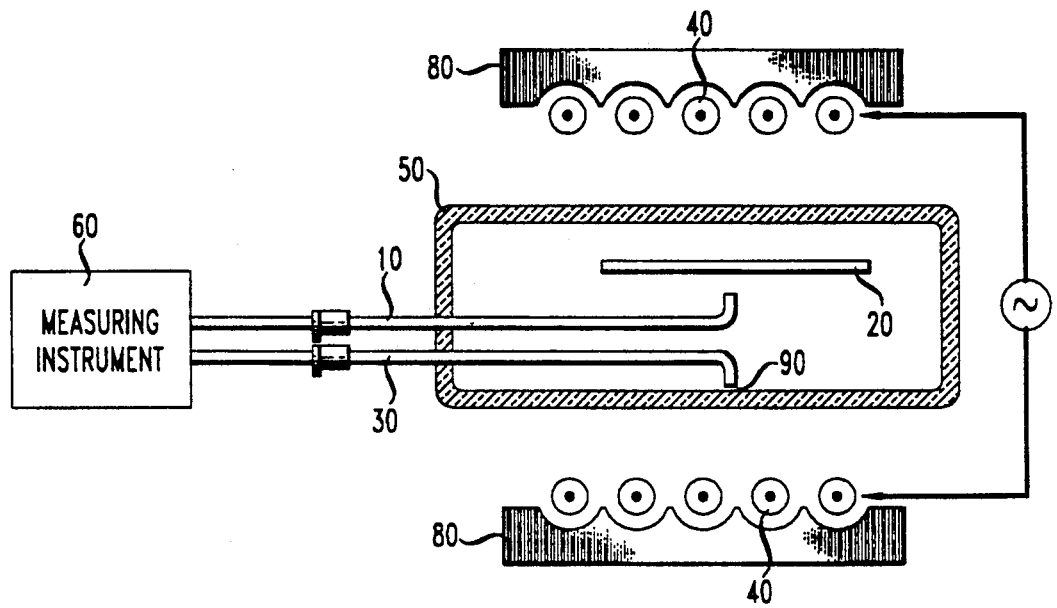
FIG. 1 is a simplified, schematic drawing of an RTP system of the prior art.
Figure 2:
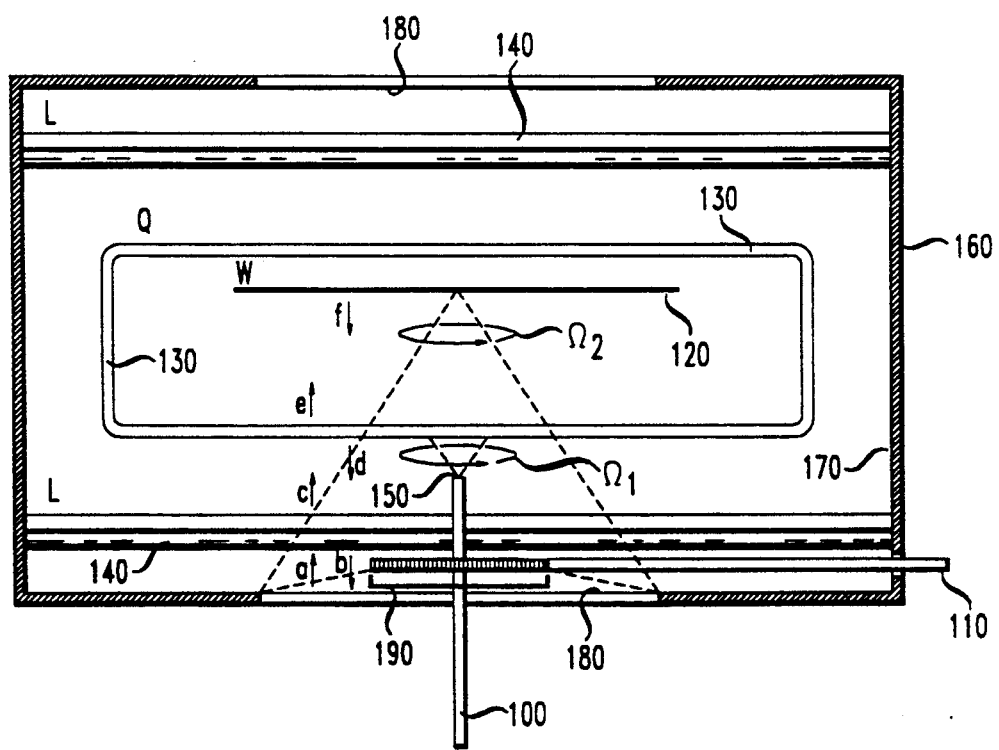
FIG. 2 is a simplified, schematic drawing of an RTP system including a pair of radiation-sensing probes according to the invention. Symbolically indicated in the figure are radiances arising from various parts of the system that can be interpreted, according to an appropriate model, to yield a calculated value of the wafer temperature.

Depicted in FIG. 2 is a RTP reactor in which wafer probe 100 and lamp probe 110 are arranged according to a currently preferred embodiment of the invention. Wafer 120 is enclosed within a processing chamber having a quartz envelope 130. The figure shows both probes situated outside envelope 130. In alternative arrangements, one or both probes can be installed within the envelope. As illustrated, lamps 140 are installed in banks on two opposing side of envelope 130. (In alternate reactor designs, only a single lamp bank is used.) Entrance face 150 of the wafer probe is directed toward the wafer. As illustrated, the wafer probe is situated between the wafer and the nearest bank of lamps. (In reactors having only one lamp ban, this probe can alternatively be situated on the opposite side of the wafer from the lamps.) The wafer probe is exemplarily a sapphire light-pipe probe 1.3 mm in diameter, and having an optically flat entrance face. Probe 100 captures wafer radiance from a relatively small spot on the wafer surface, exemplarily about 1.5 cm in diameter. In order to minimize the shadow cast by probe 100 on the wafer, this probe is desirably oriented perpendicular to the wafer, and inserted through a gap between a successive pair of lamps in one of the lamp banks.

Enclosure 160 at least partially surrounds the quartz envelope and the lamps. This enclosure has an inner surface 170. In order to enhance the uniformity of the radiation field within the reactor, it is desirable to treat at least a portion of surface 170 to make it a diffuse reflector of radiation at least at the significant lamp wavelengths.

For example, we used a Model 410 Heatpulse reactor commercially available from AG Associated of Sunnyvale, Calif. Most of surface 170 of this reactor, as originally provided, was plated with gold. However, those portions 180 of surface 170 that faced the wafer were coated with a white, ceramic material that provided nearly Lambertian reflective surfaces. These portions were disks roughly 80% the diameter of standard 100-mm wafers.

Lamp probe 110 is preferably situated between a lamp bank and a surface 170, adjacent a diffusively reflective surface portion 180. Entrance face 190 is oriented such that radiation is mainly collected from surface 170. In a departure from the prior art, this probe is deigned to collect radiation from an area of surface 170 (substantially coinciding with portion 180) that is substantially larger than the wafer area sampled by probe 100. By way of example, we have used probe 110 to sample a surface area of about 16 cm$^2$.

As shown in FIG. 2, probe 100 samples an area of the wafer surface that subtends a solid angle $\Omega_1$ at the probe, and probe 110 samples an area of surface 170 that subtends a solid angle $\Omega_2$ at the wafer. In order to obtain an acceptable approximation to the hemispherical reflectivity of the wafer, it is desirable for $\Omega_2$ to be greater than, or at least approximately equal to, $\Omega_1$ In at least some cases, this condition will be satisfied if probe 110 samples an area of surface 170 that is at least about 10 times the wafer area sampled by probe 100.

Figure 3:
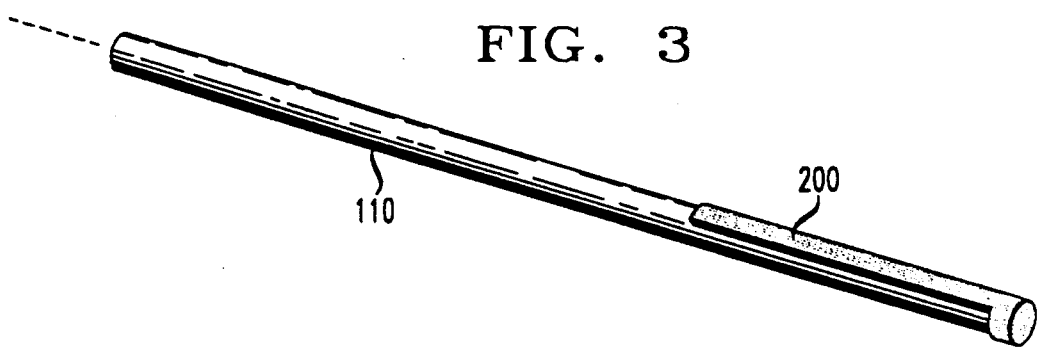
FIGS. 3-7 are schematic representations of alternate probes for sampling radiation incident on the wafer, according to the invention in one embodiment.

In a currently preferred embodiment, probe 110 is a sapphire light-pipe probe, 1.3 mm in diameter. Probe 110 extends in a direction parallel to the plane of the lamps of the nearest lamp bank, but diagonal to the long axes of the lamps. The probe is preferably situated in such a way that it averages radiation collected along the lamp filaments together with radiation collected in the interstices between lamps. The entrance face is defined in an end portion of the probe, exemplarily about 4 cm long. As shown in FIG. 3, the entrance face is defined by coating this portion, on the side that faces the wafer and lamps, with a stripe 200 of white, diffusely reflective material. The same material is desirably used to coat the end face of the probe to attenuate radiation entering through that portion. One reflective material suitable for this purpose is Aremco high-temperature alumina ceramic cement No. 503, commercially available from Aremco Products, Inc. of Ossining, N.Y., (After application, this cement is cured by firing it.) the angular extend of stripe 200 is typically about 120°. The corresponding portions of the probe surface that are free of the ceramic material constitute the entrance face. Most of the radiation entering this entrance face is scattered by the ceramic material, and a portion of the scattered radiation is captured by the probe. The entrance face is exemplarily situated about 1 cm away from surface 170. Probe 110 has a very small effect on the radiation incident on the wafer, because at the wafer, the radiation reflected from stripe 200 has properties very similar to the radiation reflected from adjacent portions of surface 170.

An antenna pattern is readily measured or calculated for probe 110. The projection of this pattern onto surface 170 can be represented as a series of contours describing the capture efficiency of the probe as a function of position. These contours will generally be elliptical, with respective principal axes parallel and perpendicular to the probe. In at least some cases, it may be desirable to adjust the length of the entrance face to make these axes equal in length, resulting in a circular receptivity pattern. As noted, we achieved this in the exemplary probe by making the entrance face about 4 cm long.

One measure of the spatial extent of the receptivity pattern is the area that contributes a given fraction of the total collected radiation. Accordingly, the area "effectively" sampled by a probe is herein understood to be the central area (or the corresponding solid angle) that contributes 50% of the total collected radiation.

Each of probes 100 and 110 will generally exhibit some receptivity in the backward direction as well as the forward direction. (The backward direction of probe 100 is away from the wafer, and the backward direction of probe 110 is toward the wafer.) The sensitivity of the probe in the forward direction can be calculated by integrating the antenna pattern over the forward hemisphere and (by appropriate calibration) expressing the integral in units of, e.g., photodiode detector current per unit areal power density. The result is herein denoted $s_1$ for probe 100 and $s_2$ for probe 110. The backward sensitivity, obtained by a similar procedure, is conveniently expressed as a fraction $c_i$ of the forward sensitivity; i.e., as $s_i c_i$, where $i=1$ for probe 100 and $i=2$ for probe 110. The coefficients $c_i$ are referred to herein as "isotropy parameters" because $c_i$ will be unity for a completely isotropic probe and zero for a completely anisotropic probe. The isotropy parameters are explicitly included in the radiation modes described below. (See Eqs. 5, below.) As a consequence, accurate temperature measurements can be made using probes of various designs, having antenna patterns that vary widely in their degree of isotropy. For example, we have successfully tested probes in which the isotropy parameter is as high as about 0.20–0.33, and we believe that accurate temperature measurements can be made with even greater isotropies.

Figure 4:

The scope of the invention is intended to include alternative designs for probe 110. For example, the design for probe 110 depicted in FIG. 4 terminates in an elongated, conical taper directed toward surface 170. This probe is made from, e.g., a quartz or sapphire rod 1.27 mm in diameter. The taper is, e.g., 6.4–12.7 mm long. The taper has a frosted surface 210 by functions as the entrance face. In, e.g., a sapphire or quartz probe, this face will collect radiation from a view angle as great as about 180°, thus providing a wide-field probe. A wide-field probe is particularly useful in a reactor having a lamp bank on only one side of the wafer, so that the other side of the wafer is illuminated by multiple reflections from surface 170. In a reactor of this kind, both probes will typically be situated outside the quartz envelope, on the indirectly illuminated side of the wafer. The wide field of view leads to detection of an average radiation field (on the indirectly illuminated side of the wafer) that is relatively insensitive to local imperfections in the reflective properties of surface 170.

Figure 5:
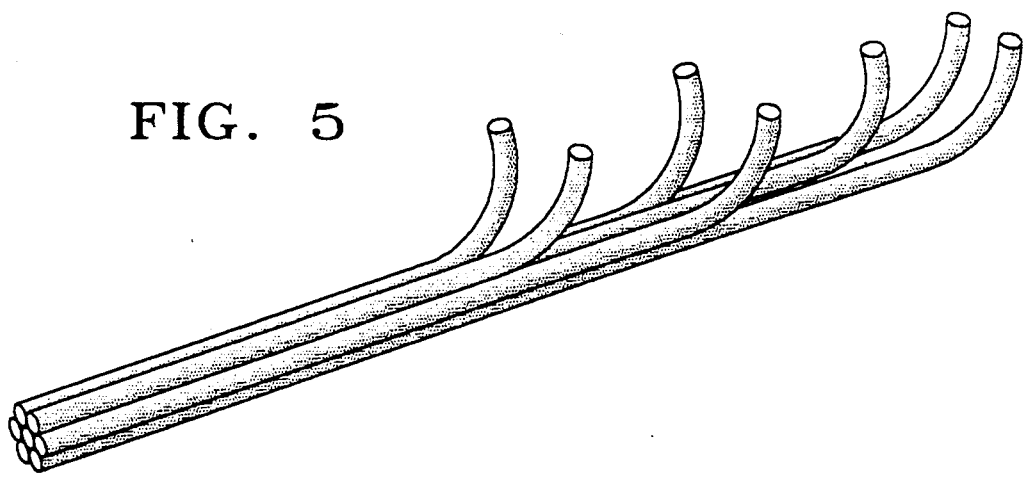

By contrast, a wide-area probe is preferable when the probe is situated between the wafer and a lamp bank, because scattering from surface 170 will not be effective for averaging the non-uniform lamp radiation. One type of wide-area probe is the horizontal probe of FIG. 3. We have also successfully tested several wide-area probes based on bundles of quartz rods. (Other wave guiding materials, such as sapphire, can also be used for this purpose.) For example, FIG. 5 depicts a probe in which the endfaces of seven rods are arranged in a hexagonal array directed toward the lamps (and surface 170). The spacing of the endfaces is chosen to provide substantial overlap between the portions of surface 170 sampled by respective rods, resulting in a relatively wide and relatively uniform receptivity pattern.

One desirable feature of a wide-area probe is that there is a relatively low correlation between the incident direction of sampled radiation and the point of origin of that radiation in the sampled area. That is, the central 50% (in power) of the cone of radiation intercepted by the probe from each point of the sampled area is readily calculated from the antenna pattern of the probe. The area sampled by a wide-area probe will generally include at least two points, situated more than 1 cm apart, for which these central cones have the same orientation and substantially differ only in their translational positions. This feature helps to assure that the probe samples the radiation field uniformly.

Figure 6:
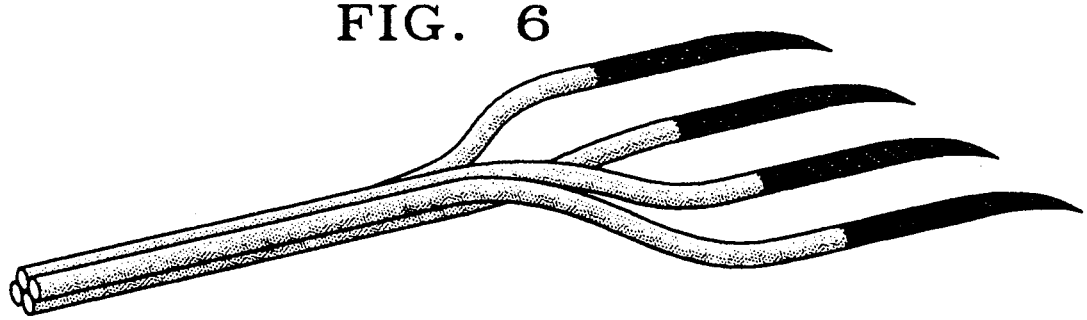

As another example, FIG. 6 depicts a probe in which four rods are arranged in a parallel array resembling the tines of a fork. To provide a scattering surface, the wafer side of each tine is frosted, exemplarily by mild abrasion. It is desirable for the scattering surface to be translucent, in order to avoid casting a shadow on the wafer, which may lead to non-uniform heating. (There is a greater tendency for such shadows to form on the directly illuminated side of the wafer because direct illumination has a greater directional component, and because geometrical constraints imposed by the lamps may force the probe to be situated closer to the wafer.) Consequently, frosting is generally preferable to overcoating. (However, an overcoating that is thin enough to be translucent may also be acceptable.) As noted, the backward receptivity of a probe with a translucent back face can be accounted for by isotropy parameters in the radiation model. The sensing portion of the probe of FIG. 6 is exemplarily about 3.2 cm long and about 2.5–3.2 cm wide. The ends of the tine-like projections are tapered in order to suppress the transmission of radiation through these ends. (The scattering surface can be opaque if the probe is situated on the side of the wafer opposite the lamps in a one-sided illumination geometry. In that case, the probe ends can be overcoated rather than tapered.)

Figure 7:
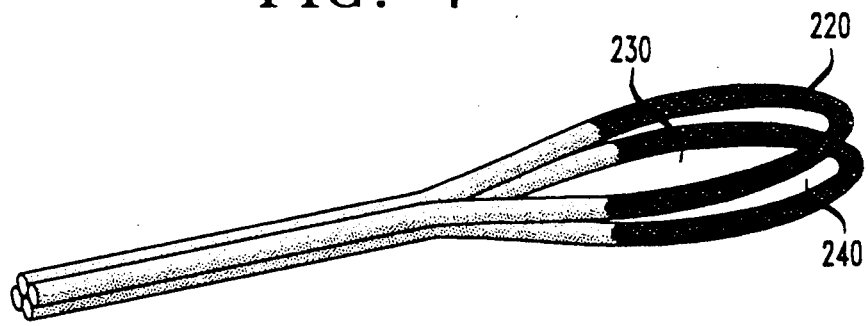

FIG. 7 depicts yet a third exemplary probe, in which each of two long rods is bent back on itself such that a paddle-shaped loop is formed at the sensing end. The loops preferably overlap such that the sensing region is subdivided into three sectors 220–240 of about equal widths in the direction transverse to the rods. This sensing region is exemplarily about 3.2 cm in maximum longitudinal and transverse extent. As in the probe of FIG. 6, the surface that faces the wafer is frosted. This design is advantageous because there is no problem of transmission through the endfaces of the rods.

Turning back to FIG. 2, we now introduce a model for the radiation field within the reactor that will be useful for making temperature inferences of improved accuracy. Several radiant emittances are defined as follows: The emittance from surface 170 is denoted a; from lamps, b (toward surface 170) and c (toward the wafer); from the quartz envelope, d (toward the lamps) and e (toward the wafer); and from the wafer, f. Transmittance $\tau_Q$ and $\tau_L$ are defined for the quartz envelope and the lamps, respectively. Reflectances $\rho_{Cl}$, $\rho_Q$, and $\rho_L$ are defined for surface 170, the quartz envelope, and the lamps, respectively. The hemispherical reflectivity of the wafer is denoted $\rho_W$. The thermal emittance of the wafer is denoted w, and the thermal emittance of the lamps is denoted l. Probe 100 will be sensitive mainly to radiance d, and probe 110 will be sensitive mainly to radiance a. The radiation model is expressed by the following set of equations:

$$a = \rho_C b$$

$$b = l + \rho_L a + \tau_L d$$

$$c = l + \rho_L d + \tau_L a$$

$$d = \rho_Q c + \tau_Q f$$

$$e = \tau_Q c + \rho_Q f$$

$$f = w + \rho_W e. \tag{1}$$

These equations can be combined to express the wafer emittance w in terms of a radiance factor $d - ra$. The coefficient r is defined as $$r = \frac{\rho_Q + \rho_W(\tau_Q^2 - \rho_Q^2)(\rho_C^{-1} + \tau_L - \rho_L)}{1 - \rho_W \rho_Q + (\tau_L - \rho_L)[\rho_Q + \rho_W(\tau_Q^2 - \rho_Q^2)]}. \tag{2}$$

The second term of the radiance factor accounts for the contribution of reflected radiation to the total wafer emittance. In terms of this radiance factor, the wafer thermal emittance is expressed by $$w = \tau_Q^{-1} \{1 - \rho_W \rho_Q + (\tau_L - \rho_L)[\rho_Q + \rho_W(\tau_Q^2 - \rho_Q^2)]\} \cdot (d - ra), \tag{3}$$

and the hemispherical reflectivity of the wafer is expressed by $$\rho_W = \frac{r[1 + (\tau_L - \rho_L)\rho_Q] - \rho_Q}{(1 - r)(\tau_L - \rho_L)(\tau_Q^2 - \rho_Q^2) + \rho_C^{-1}(\tau_Q^2 - \rho_Q^2) + r\rho_Q}. \tag{4}$$

It is assumed that the wafer reflectivity $\rho_W$ is not known a priori. Instead, the quantities $d - ra$ and r are inferred from the probe signals and used to compute w and $\rho_W$. Given a value for $\rho_W$, the wafer emissivity $\epsilon$ is readily reduced from the relation $\epsilon = 1 - \rho_W$. The wafer temperature is then inferred from the Planck radiation law and the values of w and $\epsilon$.

In a useful approximation for relating the probe signals to $d - ra$ and r, the lamps are treated as perfectly transparent. Accordingly, the probe signals are treated as dependent solely on the radiances a and d, and their dependence on b and c is neglected. The signal from probe 100 is denoted $S_1$, and the signal from probe 110 is denoted $S_2$. As discussed above, probe 100 has a sensitivity $s_1$, and probe 110 has a sensitivity $s_2$. Isotropy parameters $c_1$ and $c_2$ are readily determined for probes 100 and 110, respectively, by measuring or calculating their antenna patterns. These parameters are related to the probe signals according to:

$$S_1 = s_1(d + c_1 c),$$

$$S_2 = s_2(a + c_2 b). \tag{5}$$

As noted, each probe signal includes an ac component. The magnitudes of these components are respectively denoted $\Delta S_1$ and $\Delta S_2$, and their ratio is denoted R, i.e., $$R = \frac{\Delta S_1}{\Delta S_2}. \tag{6}$$

In the configuration of FIG. 2, this measurable quantity is related to the coefficient r by the expression.

$$r = 1 - \frac{1 + c_1 \rho_c^{-1} - \frac{s_2}{s_1} R(1 + c_2 \rho_c^{-1})}{1 - c_1(\tau_L - \rho_L)}, \tag{7}$$

and to the radiance factor $d - ra$ by the expression $$(d - ra) = \frac{1}{s_1} \frac{S_1 - RS_2}{1 - c_1(\tau_L - \rho_L)}. \tag{8}$$

The sensitivity coefficients $S_1$ and $S_2$ are independent of the specific wafer being processed. Consequently, they can be evaluated empirically, for example in calibration runs using instrumented wafers.

It should be noted that the fluctuations of lamp radiation within the reactor are more complicated than simple ripple at twice the power-line frequency. In addition to fluctuations at harmonics of this frequency, there are also non-harmonic fluctuations attributable, e.g., to variations in lamp power caused by the feedback circuit that controls the wafer temperature, and to the finite response time of the lamps. If detection is limited to the harmonic fluctuations, the subtraction in the expression $S_1 - RS_2$ of Equation (8) may fail to eliminate the time dependent. reflected radiation component from the evaluation of the wafer thermal emittance w. This, in turn, will lead to inaccuracies int he temperature measurement.

Consequently, we prefer to compute the signals $S_i$ and $\Delta S_i$ (i=1,2) from time-dependent first and second moments. That is, the optical signals from the probes are directed to photodiode amplifiers, and the amplifier outputs are fed into analog-to-digital converters (ADCs), leading to digitized signals $V_1(t)$ and $V_2(t)$ corresponding to probe 100 and 110, respectively. The sampling times t are spaced at intervals $\delta_1$ typically equal to 0.2 ms. The amplifiers have analog filters of about 1 ms to suppress digitization aliasing noise. Temporal running averages of $V_i$ and $V_i^2$ (i=1,2) are computed by digital, recursive filtering according to the following expression:

$$U_i^{(n)}(t) = U_i^{(n)}(t - \delta_1) + \frac{\delta_1}{\tau_1} \{[V_i(t)]^n - U_i^{(n)}(t - \delta_1)\}, \tag{9}$$

where n=1 for the linear average and n'2 for the quadratic average. The time constant $\tau_1$ is typically set near 10 ms, which permits tracking the more slowly varying temperature fluctuations. The signals for the reflectance and radiance are determined at a longer time interval $\delta_2$, typically $100\delta_1$, from the following expressions for the first and second moments:

$$M_i^{(1)}(t) = M_i^{(1)}(t - \delta_2) + \frac{\delta_2}{\tau_2} \{U_i^{(1)}(t) - M_i^{(1)}(t - \delta_2)\}, \tag{10}$$

$$M_i^{(2)}(t) =$$

$$M_i^{(2)}(t - \delta_2) + \frac{\delta_2}{\tau_2} \{U_i^{(2)}(t) - [U_i^{(1)}(t)]^2 - M_i^{(2)}(t - \delta_2)\}.$$

Here, the recursive filter constant $\tau_2$, typically 60 ms, determines the time constant of the pyrometer response. The dc and ac probe-signal amplitudes are respectively determined as $$S_i(t) = M_i^{(1)}(t) - M_i^{(1)}(0),$$

$$\Delta S_i(t) = [M_i^{(2)}(t) - M_i^{(2)}(0)]^{\frac{1}{2}}. \quad (11)$$

The terms $M_i^{(n)}(0)$ are the dc and ac background noise computed when the lamps are off (prior to wafer processing).

EXAMPLE

We used a system, substantially as described above, to measure the temperatures of a group of 10-cm and 12.5-cm silicon wafers. In order to evaluate the degree to which our measurements are affected by variations in surface specularity of patterning, we made some measurements with the polished or device side of the wafer directed toward probe 100, and other measurements with the opposite side directed toward the probe. The test wafers were coated with films or patterns chosen to vary the wafer emissivity over a broad range. These patterns included circuits having features as small as 1 $\mu$m. Some of the back wafer surfaces that we observed included pyramidal etch pits that scatter radiation directionally. We also varied wafer orientations by axial rotation.

Probe 110 was a horizontally disposed probe with a 4-cm, partially coated end portion, as described above. The probe signals were coupled to a commercially available pyrometer through flexible fiber-optic cables. Before detection, these signals passes through optical filters having a passband from 960–1040 nm. This filtering was performed to decrease interference from lamp radiation, and to reduce the sensitivity of the measurements to wavelength dispersion in the wafer reflectivity.

The temperature tests spanned the range 650° C.–1000° C. The probe signals were analyzed according to the theoretical model described above. The values of the model parameters listed in Table I. The parameters $S_1$ and $S_2$ were determined by a least-squares fit to data obtained with thermocouple wafers. The isotropy parameters $c_1$ and $c_2$ were determined by experimentally mapping the antenna patterns of the probes. In setting the parameters that describe the quartz envelope, we assumed clean specular surfaces, such that $\tau_Q + \rho_Q = 1$.

Figure 8:
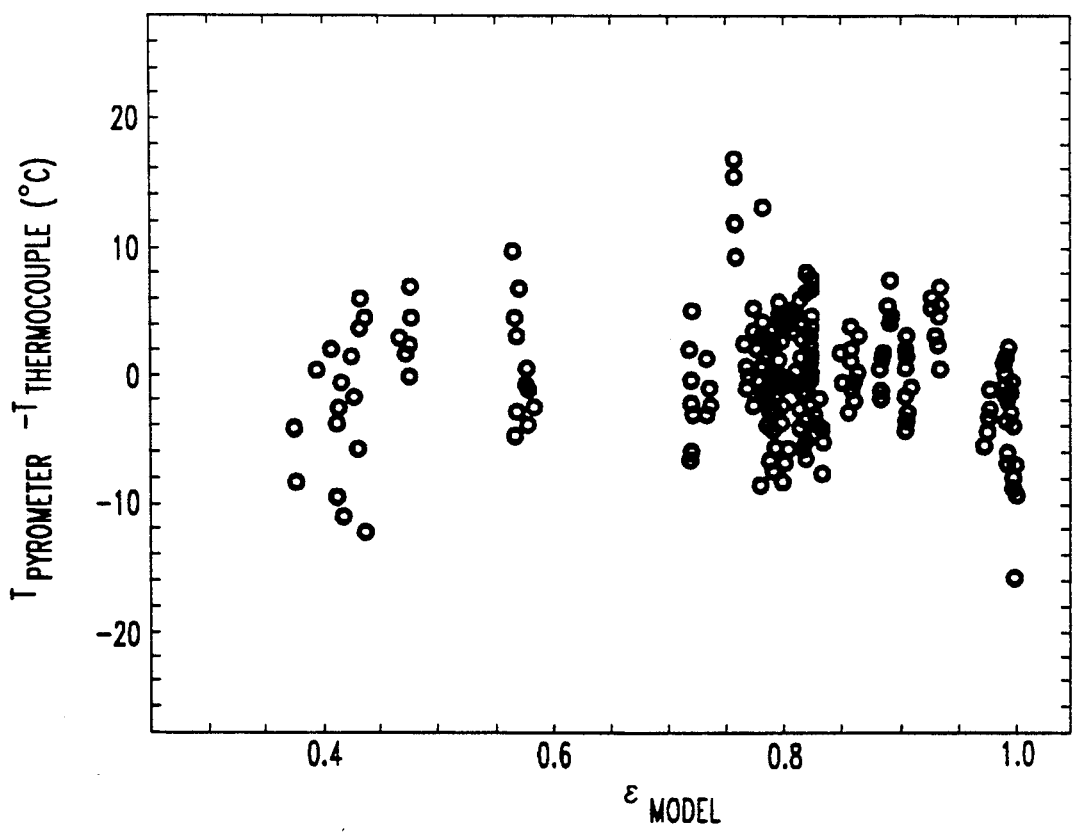
FIG. 8 is a graph showing the relation between error in temperature measurements made according to the invention and calculated values of the wafer emissivity.

FIG. 8 shows the error in the temperature measurements as a function of the wafer emissivity $\epsilon_{model}$ calculated from the model. The temperature errors are relative to the measurements by 75-$\mu$m chromel-alumel (type K) thermocouples bonded to the top surfaces of the test wafers with Aremco zirconia and alumina cement.

It should be noted that although the accuracy of the inferred emissivity $\epsilon_{model}$ depends on the accuracy to which the isotropy and chamber parameters are known, some of these uncertainties are canceled out in the temperature calculation. For example, some of these errors may be compensated when $s_1$ and $s_2$ are empirically determined. As a consequence, even a computed value for $\epsilon_{model}$ that gives accurate temperature results may deviate from the actual wafer emissivity.

We found no significant correlation between the temperature error and $\epsilon_{model}$, except at temperatures near the threshold of sensitivity of our method. We found that for bare silicon wafers, this threshold lies near 600° C.

Figure 9:
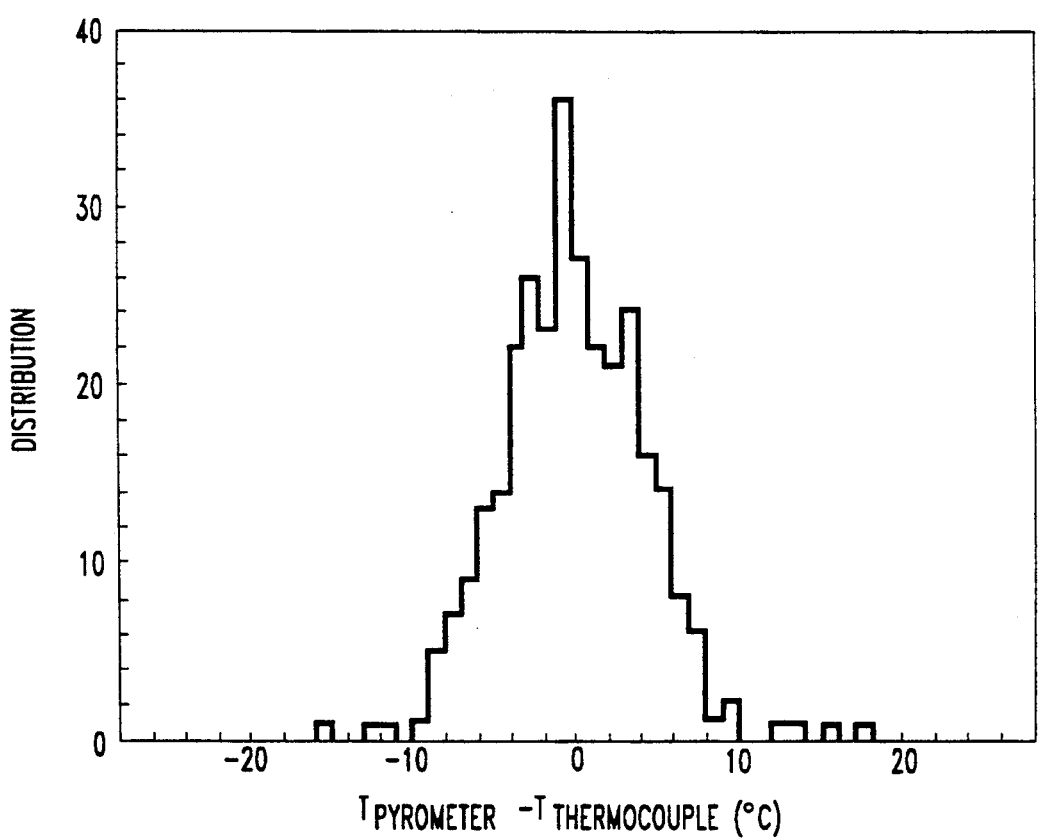
FIG. 9 is a histogram of the temperature errors determined in a series of trial runs in which temperature determinations according to the inventive method were compared with direct thermocoupled measurements of the wafer temperature.

FIG. 9 presents a histogram of the temperature errors. The standard deviation of this distribution is about 4° C. We attribute the few larger errors to systematic effects such as non-uniform wafer heating due to patterns on the wafer surfaces, the faults in some of the thermocouple contacts.

TABLE I

| $s_1/s_2$ | $c_1$ | $c_2$ | $\rho_C$ | $\tau_Q$ | $\rho_Q$ | $\tau_L$ | $\rho_L$ |
|---|---|---|---|---|---|---|---|
| 2.1 | 0.006 | 0.32 | 0.98 | 0.95 | 0.05 | 0.92 | 0.05 |

I claim:

1. A process for heating a body, comprising the steps of exposing the body to a controllable flux of electromagnetic radiation from at least one lamp energized by time-varying electric current, measuring the surface temperature of the body, and in response to the temperature measurement, controlling the flux of radiation, wherein the measuring step comprises:
   a) collecting radiation emitted and reflected by the body in a first light-pipe probe and detecting said radiation, leading to a first probe signal denoted $S_1$;
   b) collecting a portion of radiation propagating toward the body in a second light-pipe probe, said portion comprising radiation reflected from a diffusively reflective surface, and detecting said radiation, leading to a second probe signal denoted $S_2$;
   c) determining magnitudes of time-varying components of $S_1$ and $S_2$, said magnitudes respectively denoted $\Delta S_1$ and $\Delta S_2$; and
   d) mathematically combining $S_1$, $S_2$, $\Delta S_1$, and $\Delta S_2$ such that a surface temperature of the body is calculated, characterized in that:
   e) in step (a), the first probe effectively samples radiation from an area of the body that subtends a solid angle $\Omega_1$ at the first probe;
   f) in step (b), the second probe effectively samples radiation from an area of the diffusively reflective surface that subtends a solid angle $\Omega_2$ at the nearest surface of the body; and
   g) $\Omega_2$ is greater than or approximately equal to $\Omega_1$.

2. Process of claim 1, wherein the second probe effectively samples radiation from an area of the diffusively reflective surface that is at least about ten times the body area effectively sampled by the first probe.

3. Process of claim 1, wherein the radiation portion of step (b) includes radiation directly incident on the second probe from the lamp.

4. Process of claim 1, wherein the body has first and second opposing principal surfaces, in the exposing step lamp radiation is directly impinged only on the first principal surface, the diffusively reflective surface is situated adjacent the second principal surface, and the second probe is situated intermediate the diffusively reflective surface and the second principal surface.

5. Process of claim 4, wherein the second probe includes a conical end portion directed toward the diffusively reflective surface, said end portion has a frosted surface, and step (b) comprises collecting radiation that impinged on the frosted surface from all azimuthal directions and is scattered by the frosted surface.

6. Process of claim 4, wherein the second probe includes at least one horizontal segment extending parallel to the second principal surface, the horizontal segment has a surface portion facing the second principal surface that is at least partially diffusively reflective, and step (b) comprises collecting radiation scattered by the diffusively reflective surface portion.

7. Process of claim 1, wherein the body has at least a first principal surface, in the exposing step lamp radiation is directly impinged at least on the first principal surface, the diffusively reflective surface is situated adjacent the first principal surface, the lamp is situated substantially within a plane intermediate the diffusively reflective surface and the first principal surface, and the second probe is situated intermediate the lamp plane and the first principal surface.

8. Process of claim 7, wherein the second probe includes at least one horizontal segment extending parallel to the second principal surface, the horizontal segment has a surface portion facing the first principal surface that is at least partially diffusively reflective, and step (b) comprises collecting radiation scattered by the diffusively reflective surface portion.

9. Process of claim 1, wherein:
each probe has a forward and a backward hemispherical receptivity and an isotropy parameter defined as the ratio of the backward to the forward receptivity;
step (d) comprises calculating an effective reflectivity r of the body that depends upon the ratio R defined by the expression $$R = \frac{\Delta S_1}{\Delta S_2};$$

and step (d) further comprises correcting the ratio R for the existence of at least one isotropy parameter that is greater than zero.

10. Process of claim 1, wherein step (c) is carried out by calculating the time-dependent second moments of $S_1$ and $S_2$, leading to calculations of $\Delta S_1$ and $\Delta S_2$, respectively.

11. Process of claim 1, wherein:
the second probe effectively samples radiation from an area of the diffusively reflective surface that includes at least two points at least 1 cm apart;
the second probe collects radiation from a respective cone emanating from each said point, each said cone having a central cone that contains 50% of the total power radiated into the cone; and
said central cores have the same angular orientation and substantially differ only in their translational positions.

* * * * *